United States Patent
Takahashi et al.

(10) Patent No.: US 6,618,351 B2
(45) Date of Patent: Sep. 9, 2003

(54) CARTRIDGE AND METHOD OF CLEANING RECORDATION MEDIUM SURFACE

(75) Inventors: Kazuo Takahashi, Tsurugashima (JP); Yoshitsugu Araki, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/991,183

(22) Filed: Nov. 14, 2001

(65) Prior Publication Data

US 2002/0085474 A1 Jul. 4, 2002

(30) Foreign Application Priority Data

Nov. 17, 2000 (JP) .......................................... 2000-351496

(51) Int. Cl.$^7$ .............................................. G11B 23/50
(52) U.S. Cl. .......................................... 369/291; 369/72
(58) Field of Search .................................. 360/133, 137; 369/72, 272, 273, 291, 292; 15/209.1, 210.1, 256.5, 256.6, DIG. 14

(56) References Cited

U.S. PATENT DOCUMENTS

| | | | |
|---|---|---|---|
| 5,161,146 A | * 11/1992 | Chaya et al. | .................. 369/72 |
| 5,260,924 A | * 11/1993 | Hayashi | ....................... 369/71 |
| 5,467,332 A | * 11/1995 | Tsurushima | .................. 369/72 |
| 6,111,726 A | * 8/2000 | Clark et al. | .................. 360/133 |

FOREIGN PATENT DOCUMENTS

| | | | |
|---|---|---|---|
| JP | 61-42792 | * | 3/1986 |
| JP | 62-229582 | * | 10/1987 |
| JP | 6-236658 | * | 8/1994 |
| JP | 6-302139 | * | 10/1994 |
| JP | 11-110701 | * | 4/1999 |

* cited by examiner

*Primary Examiner*—David L. Ometz
(74) *Attorney, Agent, or Firm*—Perman & Green, LLP

(57) ABSTRACT

The present invention relates to a cartridge and a method that can sweep away dust or the like from a recordation medium housed in the cartridge in a simple way without adversely influencing recording and replaying of the recordation medium. The cartridge includes a shutter opposed to a surface of the recordation medium, a cleaner member, a support for supporting the cleaner member, and a sweeping mechanism actuated upon opening and closing movements of the shutter. The support pivots in a plane substantially in parallel to the surface of the recordation medium when the sweeping mechanism is actuated. When the sweeping mechanism moves forwards, the cleaner member moves without contacting the recordation medium surface. When the sweeping mechanism moves backwards, the cleaner member moves in contact with the recordation medium surface to clean the recordation medium surface.

13 Claims, 4 Drawing Sheets

CARTRIDGE AND METHOD OF CLEANING RECORDATION MEDIUM SURFACE

BACKGROUND OF THE INVENTION

1. Field of the Invention

The present invention relates to a cartridge for accommodating a recordation medium such that a shutter of the cartridge faces a main surface (recordation surface) of the recordation medium and a window of the cartridge is opened and closed by the shutter. The present invention also relates to a method of cleaning the main surface of the recordation medium housed in the cartridge.

2. Description of the Related Art

Some conventional rotatable disc-shaped recordation media such as CD (compact disc) and DVD (digital versatile disc) have an exposed recordation surface (signal surface) so that recording and reproducing of signals to and from the recordation media are often significantly affected by scratches, fingerprints, dust or the like made in or adhering on a light transmissive layer in the signal surface.

In order not to be influenced by the scratches, fingerprints and dust, recent DVD-RAM and MO (magnet-optical disc) have cartridges to house the recordation media.

A typical cartridge includes a housing for accommodating a recordation medium, a shutter for opening and closing a window of the housing, and a disc clamp-and-chuck portion. When the shutter is opened, the window of the housing is opened and the recordation medium is exposed through the window. A pickup of a replay or reproduction device then scans the signal surface of the recordation medium through the window.

When the reproduction device reproduces signals recorded in the recordation medium housed in the cartridge, the cartridge shutter is opened and closed inside the reproduction device. Thus, the scratches and fingerprints are hardly ever made on the signal surface of the recordation medium, but the dust may enter the cartridge. Conventional reproduction devices do not have a mechanism for eliminating the dust from the cartridge so that the dust is accumulated inside the cartridge.

In general, a cleaning mechanism has a complicated structure and increases manufacturing cost of the reproduction device. Therefore, providing a cleaning mechanism is not practical.

If a hard brush or the like having a simple structure is provided in contact with the recordation medium such as a disc, it can clean the disc surface, but it may scratch the disc surface and hinder the smooth rotation of the disc. Scratching and irregular rotation of the disc adversely affect the signal recordation and retrieval.

SUMMARY OF THE INVENTION

An object of the present invention is to provide a cartridge that is equipped with a simple mechanism for discharging obstacles such as dust out of the cartridge without adversely influencing the signal recordation and retrieval.

Another object of the present invention is to provide a method of cleaning a surface of a recordation medium without adversely influencing the signal recordation and retrieval.

According to one aspect of the present invention, there is provided a cartridge adapted to house a recordation medium, comprising, a shutter opposed to a main surface of the recordation medium, a cleaner member, a support for supporting the cleaner member, and a sweeping mechanism actuated upon opening and closing movements of the shutter such that the support pivots in a plane substantially in parallel to the main surface of the recordation medium to cause the cleaner member to contact and clean the recordation medium.

The support may be pivotable about one end of the support. The sweeping mechanism may be a direct-driven cam mechanism that includes a cam surface and a follower. The cam surface may be defined by a lateral face of a projecting member provided on an inner wall of the shutter and extend across a moving direction of the shutter. The follower may be provided on the support and biased against the cam surface to contact the cam surface.

The cam surface may have a disengagement portion at one end of the projecting member to disengage the follower from the cam surface. The disengagement portion may include a tapered portion. The projecting member may have an upper surface substantially in parallel to the main surface of the recordation medium. The cleaner member and follower may be both provided at a free end of the support. Alternatively the cleaner member may be provided at a free end of the support and the follower may be provided at other than the free end of the support. Alternatively the follower may be provided at a free end of the support and the cleaner member may be provided at other than the free end of the support. The cartridge may further include a spring for biasing the support.

According to another aspect of the present invention, there is provided a method of cleaning a main surface of a recordation medium housed in a cartridge, the cartridge having a shutter opposed to the main surface of the recordation medium, the method comprising the step of causing a support member that supports a cleaner member to pivot in a forward route in substantially parallel to the main surface of the recordation medium such that the cleaner member moves without contacting the main surface of the recordation medium upon one of opening and closing movements of the shutter, and the step of causing the support member to pivot in a backward route opposite the forward route such that the cleaner member moves contacting the man surface of the recordation medium upon the other of the opening and closing movements of the shutter.

A moving speed of the cleaner member may be greater in the backward route than the forward route. The method may further include the step of causing the recordation medium to rotate while the support is moving in the forward and backward routes. The opening and closing movements of the shutter may take place within an apparatus for replaying the recordation medium.

DETAILED DESCRIPTION OF THE INVENTION

An embodiment of the present invention will be described in reference to the accompanying drawings.

Figure 1:
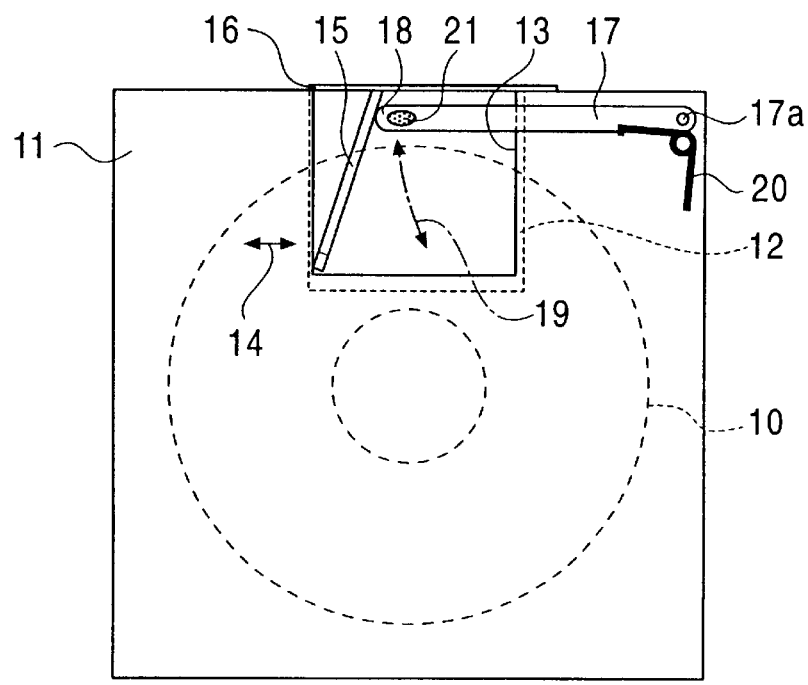
FIG. 1 illustrates a partially cut plan view of a cartridge according to one embodiment of the present invention.
Figure 2:
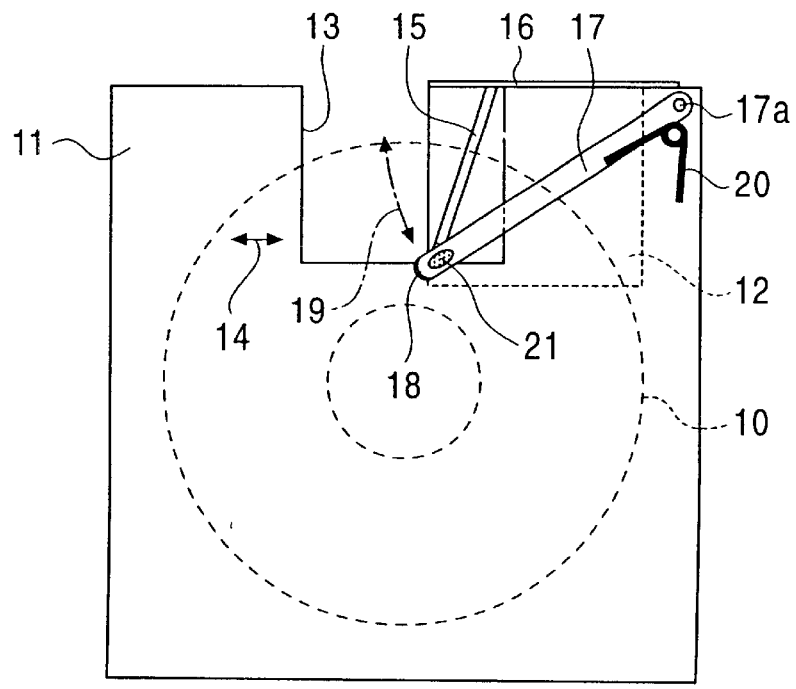
FIG. 2 is similar to FIG. 1 and illustrates the cartridge when a shutter of the cartridge is opened midway.

Referring to FIG. 1, illustrated is a partially cut plan view of a cartridge for housing a recordation medium (e.g., disc) 10. An upper half of a housing of the cartridge is not illustrated. FIG. 1 therefore shows the recordation medium 10 on a lower half of the cartridge housing 11, together with a shutter 12 in a closed state. FIG. 2 is similar to FIG. 1 and illustrates the cartridge when the shutter 12 is open halfway. A window 13 of the cartridge is opened and closed by the shutter 12. When the cartridge window 13 is opened, part of a main surface (signal surface) of the recordation medium 10 is exposed through the window 13. The shutter 12 can move in directions, as indicated by the double arrow 14, along a guide member (not shown) provided in the cartridge. A projecting rod element 15 is provided on an inner surface of the shutter 12. The projecting rod element 15 diagonally extends from a connection element 16. When the shutter 12 slides in the directions 14, therefore, the elongated rod element 15 also moves in the directions 14, while maintaining the diagonal posture of the rod element 15.

Another rod-shaped element 17 is pivotable about a pivot shaft 17a provided at one end of the rod element 17. The pivot shaft 17a extends in a thickness direction (direction perpendicular to the drawing sheet) of the cartridge and is supported between the opposite halves 11 of the cartridge housing. A free end 18 of the rod element 17 can therefore swing (pivot) in directions as indicated by the double arrow 19 when the shutter 12 moves in the directions 14. The counterclockwise pivot movement is referred to as a forward movement of the rod element 17, and the clockwise pivot movement is referred to as a backward or return movement. The free end 18 of the rod element 17 is a trailing member (follower) of the rod member (cam) 15. The rod element 17 is biased outwards, relative to the recordation medium 10, by a spring 20 located at an upper right corner of the cartridge. The free end 18 of the rod element 17 contacts a lateral portion of the projecting element 15 of the shutter 12, and slides along the projecting element 15 when the shutter 12 moves. In the vicinity of the free end 18 of the rod element 17, a cleaner member 21 is provided that is directed to the recordation medium 10. The rod element 17 is a support of the cleaner member 21.

As illustrated in FIG. 1, the cleaner member support 17 extends along an upper side of the cartridge housing 11 when shutter 12 is closed. The free end 18 of the support 17 is therefore spaced from the recordation medium 10 in the illustrated condition. When the shutter 12 starts opening, the free end 18 of the support 17 is pushed downwards (more precisely, downwards and leftwards) by the lateral portion of the projecting member 15 so that the free end 18 slides along the projecting member 15. Eventually, as shown in FIG. 2, the support 17 extends over (above) the recordation medium 10. When the shutter 12 is completely opened, the support 17 immediately returns to the original position shown in FIG. 1.

Figure 3:
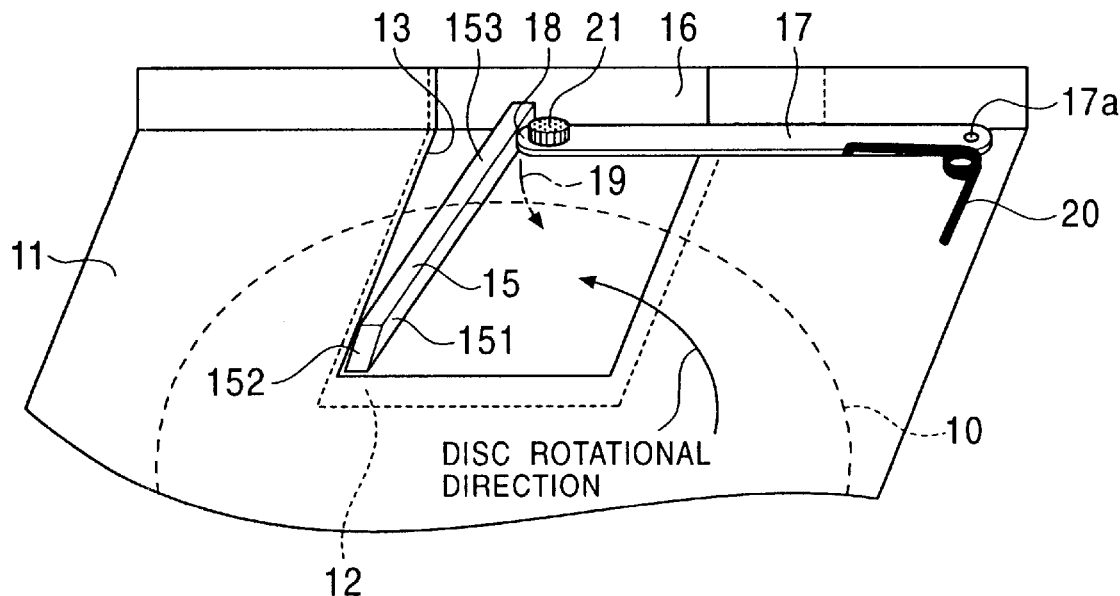
FIG. 3 illustrates an enlarged perspective view of the cartridge in a condition shown in FIG. 1.

Referring to FIG. 3, illustrated is an enlarged perspective view of the projecting member 15 and the free end 18 of the support 17 together with adjacent elements. FIG. 3 shows the same condition as FIG. 1. The projecting member 15 is provided on an inner face of the shutter 12 and extends substantially in parallel to a major surface of the recordation medium 10. In the drawing, the projecting member 15 extends diagonally from the connecting element 16 of the shutter 12 to the lower left corner of the window 13. The right lateral side 151 of the projecting member 15 extends across the moving directions 14 of the shutter 12. The lateral side 151 serves as a cam face relative to the follower 18. Since the follower 18 is biased against the cam face 151 by the spring 20, the follower 18 keeps contacting the cam face 151 during the shutter opening operation. This is therefore a direct-driven cam mechanism. The angle between the cam face 151 and the shutter moving direction 14 is an obtuse angle so that the follower 18 at the free end of the support 17 can slide along the cam face 151.

The projecting member 15 has a tapered portion 152 at its free end to disengage the follower 18 from the cam face 151. When the follower 18 of the support 17 reaches the tapered portion (disengaging or cutout portion) 152, it rides (or is pushed up) on the tapered portion 152 because the support 17 is biased outwards by the spring 20. As a result, the follower 18 of the support 17 is lifted upwards (apart) from the inner surface of the shutter 12. The angle of the tapered portion 152 measured from the inner surface of the shutter 12 is determined such that the follower or free end 18 of the support 17 smoothly rides on the tapered portion 152.

The projecting member 15 also has an upper face 153 that is substantially in parallel to the main surface of the recordation medium 10. Preferably the upper face 153 is flat. The support 17 slides on the upper face 153 of the projecting member 15. The height of the projecting member 15 from the inner surface of the shutter 12 to the upper face 153 is determined in consideration of the size of the support 17 and cleaner member 21 such that the cleaner member 21 contacts the recordation medium 10 when the support 17 moves on the projecting member 15.

When the shutter 12 opens, the cleaner member 21 adjacent to the free end 18 of the support 17 moves without contacting the recordation medium 10. When the shutter 12 completely opens, however, the tapered portion 152 of the projecting member 15 causes the support free end 18 to ride up on the top surface 153 of the projecting member 15 so that the cleaning member 21 contacts the recordation medium 10. At the same time, the spring 20 forces the support 17 to return to the original position at a high speed, with the cleaning member 21 being in contact with the recordation medium 10. Thus, the cleaning member 21 quickly cleans the recordation medium 10. This cleaning operation of the cleaning member 21 sweeps away dust from the main surface of the recordation medium 10. Accordingly, it is possible to prevent dust from remaining on the recordation medium surface.

As described above, the cleaner element 21, the support element 17 for supporting the cleaner element 21, and a sweeping mechanism including the direct-driven cam mechanism that is actuated in association with the shutter's opening and closing movements are provided inside the cartridge. The cam mechanism causes the support 17 to pivot in a plane substantially in parallel to the main surface of the recordation medium 10, thereby enabling the cleaner element 21 to contact and clean the recordation medium 10.

Operation of the sweeping mechanism will now be described.

In a situation just after a user loads the cartridge that contains the recordation medium into a replay device, the support 17 extends along the top edge wall of the cartridge as illustrated in FIG. 3. The disc-shaped recordation medium 10 then starts rotating about the center of the recordation medium. At the same time, the shutter 12 starts opening. A shutter opening and closing mechanism (not shown) provided inside the replay device causes the shutter 12 to move. In this manner, the opening and closing movements of the shutter take place in the replay device.

Figure 4:
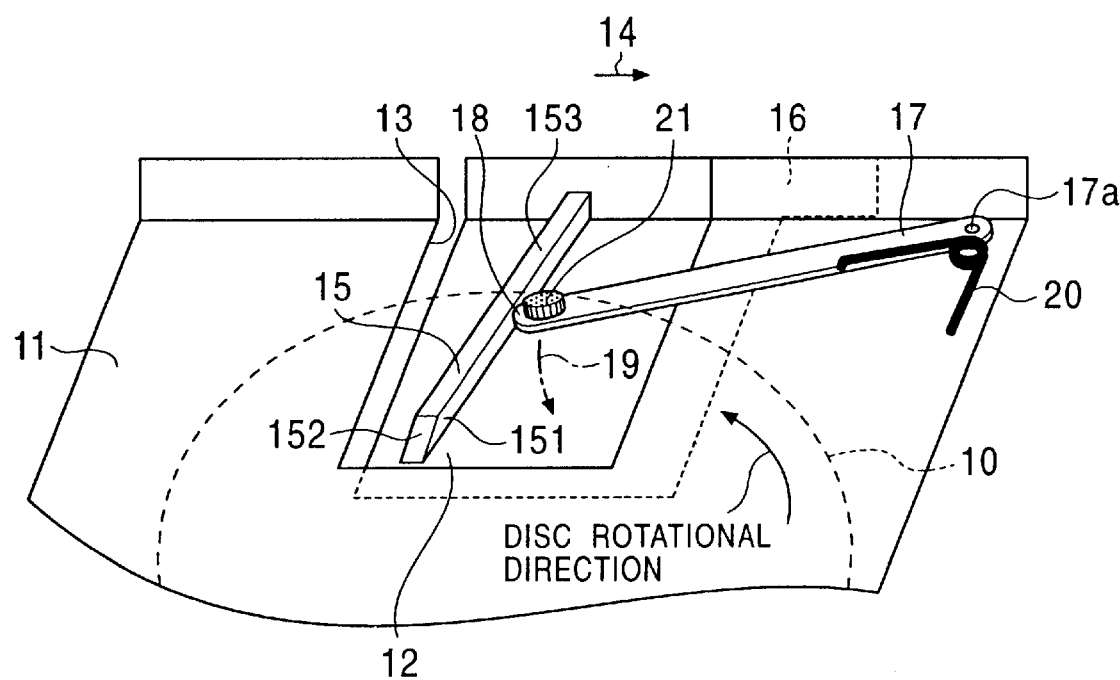
FIG. 4 illustrates an enlarged perspective view of the cartridge in a condition between the conditions of FIGS. 1 and 2.

When the shutter 12 moves and opens as illustrated in FIG. 4, the projecting member 15 slantingly extends from the connecting element 16 of the shutter 12 so as to force the free end 18 of the support 17 to pivot counterclockwise as indicated by the arrow 19 in the forward route. The brush cleaner 12 therefore moves below the recordation medium 10 without touching the recordation medium 10.

Figure 5:
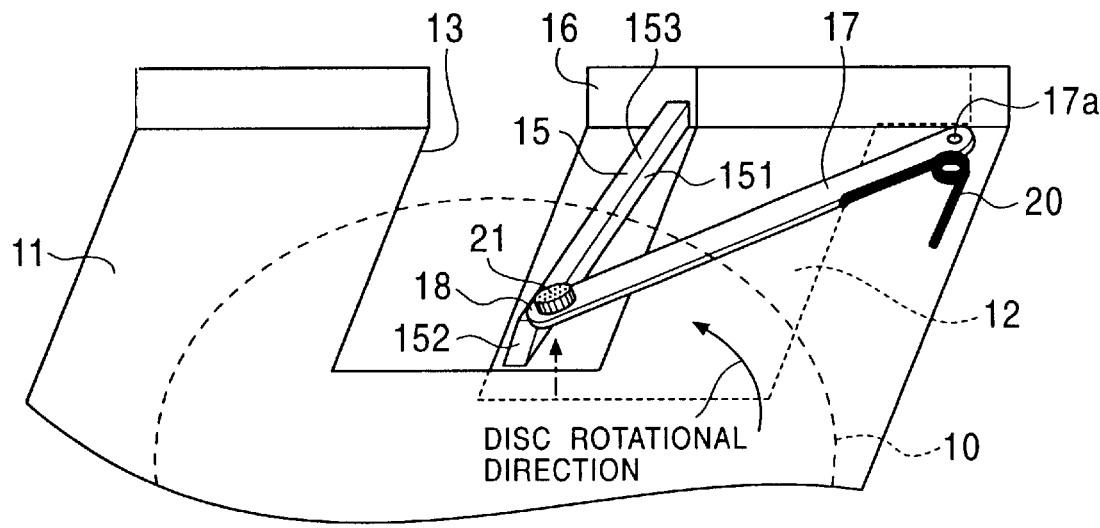
FIG. 5 illustrates an enlarged perspective view of the cartridge in the condition shown in FIG. 2.

When the support 17 further pivots in the counterclockwise direction and the free end 18 of the support 17 reaches the cutout portion 152 of the slant element 15 as shown in FIG. 5, the spring 20 causes the free end 18 of the support 17 to ride on the upper face 153 of the slant element 15 and therefore the cleaner element 21 contacts the recordation medium 10. The support 17 is then forced in the clockwise direction by the spring 20 in the backward or return route.

Figure 6:
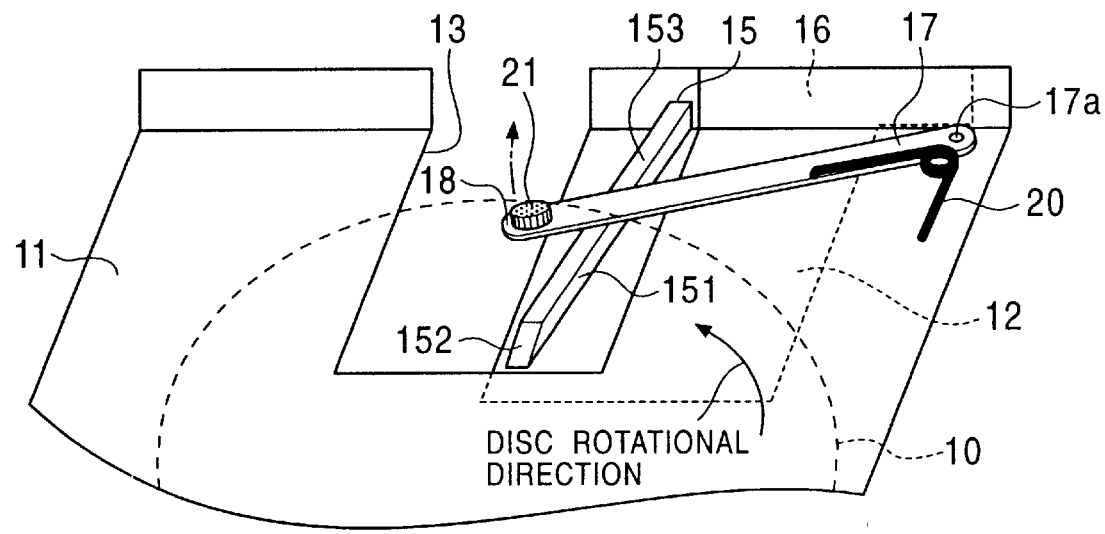
FIG. 6 illustrates an enlarged perspective view of the cartridge in a condition after FIG. 2.

Accordingly, the support 17 pivots clockwise as shown in FIG. 6 and the cleaner element 21 rapidly moves towards the outer periphery of the recordation medium 10 in contact with the recordation medium 10. The recordation medium 10 is rotating during the clockwise movement of the support 17 so that the cleaner element 21 on the support 17 sweeps off all the dust from the recordation medium 10. The moving speed of the cleaner element 21 (or the support 17) is greater when the cleaner element 21 pivots clockwise than when the cleaner element 21 pivots counterclockwise. This is because the support 17 is biased towards the outside of the recordation medium 10 by the spring 20.

Figure 7:
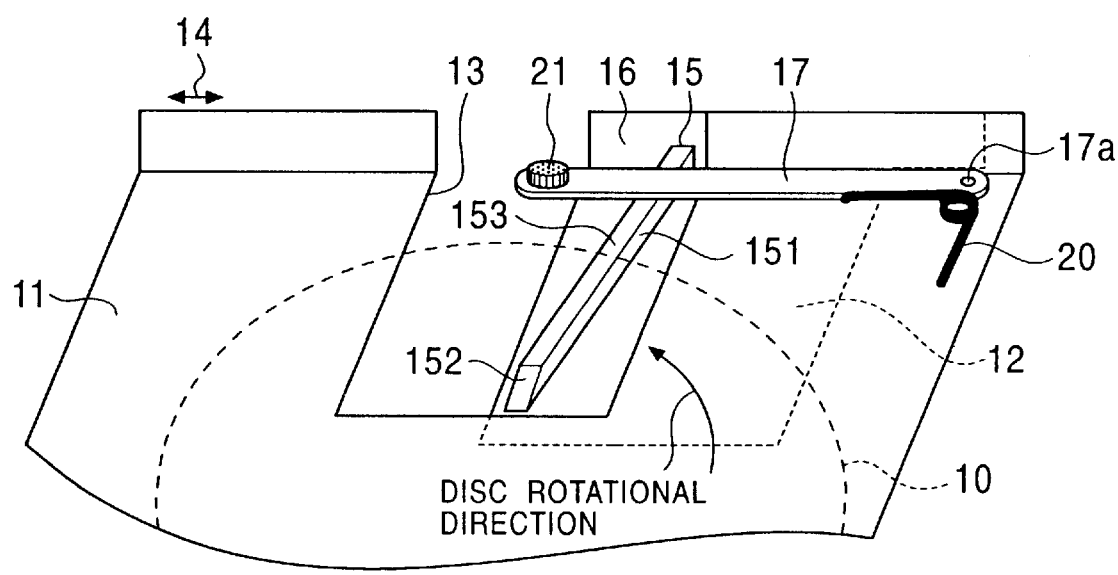
FIG. 7 illustrates an enlarged perspective view of the cartridge in a condition subsequent the condition shown in FIG. 6.

Ultimately, the support 17 collides with the top edge wall of the cartridge or a stopper, and stops the clockwise pivoting movement as shown in FIG. 7. In this situation, the shutter 12 is still in the open condition so that the colliding shock causes the swept dust to be discharged out of the cartridge through the window 13.

In the above described method of cleaning the main surface of the recordation medium 10 inside the cartridge, the support 17 that supports the cleaner element 21 pivots reciprocally in the planes substantially in parallel to the main surface of the recordation medium 10 upon the opening and closing of the shutter 12. Further, the cleaner element 21 pivots without contacting the main surface of the recordation medium 10 when the support 17 pivots towards the inside of the recordation medium whereas the cleaner element 21 pivots in contact with the main surface of the recordation medium 10 when the support 17 pivots towards the outside of the recordation medium 10. The dust, if any, on the recordation medium 10 is swept away by the cleaner element 21 that moves in contact with the recordation medium 10.

After the counterclockwise and clockwise (forward and backward) movements of the support 17, the cleaner element 21 and the support 17 do not touch the recordation medium 10 so that recording and replaying of signals to and from the recordation medium 10 are not affected by the cleaner element 21 and the support 17.

It should be noted that although the brush member is used as the cleaner member 21 in the above described embodiment, a cloth or liner sheet may be employed instead of the brush.

In order to completely sweep away the dust from the recordation medium 10, the moving speed of the cleaner element 21, which is calculated from the rotational speed of the recordation medium 10 and the width of the cleaner element (brush) 21, should be appropriately determined.

Specifically, the brush moving speed v should satisfy the following equation where the rotational speed of the recordation medium 10 is represented by $\omega$ and the brush width is represented by L:

$$v \leq \omega L / 2\pi$$

If the brush moving speed is too slow, however, the recording or replaying operation starts when the brush 21 is still in contact with the recordation medium 10. Thus, the brush moving speed is preferably close to the value $\omega L/2\pi$.

Although the above described embodiment deals with a particular construction in which the cleaner member 21 is attached to the free end 18 of support 17, and the support free end 18 itself serves as the cam follower, the present invention is not limited to the illustrated construction. For example, the cleaner member 21 may be attached to the free end of the support 17 and the cam follower may be provided at a midpoint of the support 17. Alternatively, the cam follower 18 may be provided at the free end of the support 17 and the cleaner member 21 may be provided at a midpoint of the support 17. In addition, the support 17 may have a configuration other than the rod shape. For instance, the support 17 may be planar. Furthermore, the recordation medium 10 is not limited to the disc. The recordation medium 10 may have a rectangular or square shape.

The projecting member 15 may have an overhang portion that extends from the top surface 153 over the lateral face 151 in order to assist the sliding movement of the support 17 along the lateral face 151.

Although the projecting member 15 extends linearly in the illustrated embodiment, the projecting member 15 may bend gently in the vicinity of the connecting portion 16.

As understood from the foregoing description, the present invention can provide a cartridge having a simple structure to clean the recordation medium surface since the support that pivots together with the shutter carries the cleaner member and the sweeping mechanism is provided on the inner surface of the shutter such that the cleaner member contacts and cleans the recordation medium upon pivot movement of the support. The cartridge does not adversely influence the recording and replaying of the recordation medium. The method of cleaning the recordation medium of the invention can easily sweep away the dust from the cartridge and does not affect the recording and replaying.

This application is based on a Japanese Patent Application No. 2000-351496, and the entire disclosure thereof is incorporated herein by reference.

What is claimed is:

1. A cartridge adapted to house a recordation medium comprising:

a shutter opposed to a main surface of the recordation medium;

a cleaner member;

a support for supporting the cleaner member; and a sweeping mechanism actuated upon opening and closing movements of the shutter such that the support pivots in a plane substantially in parallel to the main surface of the recordation medium to cause the cleaner member to contact and clean the recordation medium.

2. The cartridge according to claim 1, wherein the support is pivotable about one end of the support, the sweeping mechanism is a direct-driven cam mechanism that includes a cam surface and a follower, the cam surface is defined by a lateral face of a projecting member provided on an inner wall of the shutter and extends across a moving direction of the shutter, and the follower is provided on the support and biased against the cam surface to contact the cam surface.

3. The cartridge according to claim 2, wherein the cam surface has a disengagement portion at one end of the projecting member to disengage the follower from the cam surface.

4. The cartridge according to claim 3, wherein the disengagement portion includes a tapered portion.

5. The cartridge according to claim 4, wherein the projecting member has an upper surface substantially in parallel to the main surface of the recordation medium.

6. The cartridge according to claim 2, wherein the cleaner member and follower are provided at a free end of the support.

7. The cartridge according to claim 2, wherein the cleaner member is provided at a free end of the support and the follower is provided at other than the free end of the support.

8. The cartridge according to claim 2, wherein the follower is provided at a free end of the support and the cleaner member is provided at other than the free end of the support.

9. The cartridge according to claim 1 further including a spring for biasing the support.

10. A method of cleaning a main surface of a recordation medium housed in a cartridge, the cartridge having a shutter opposed to the main surface of the recordation medium, the method comprising the steps of:

causing a support member that supports a cleaner member to pivot in a forward route substantially in parallel to the main surface of the recordation medium such that the cleaner member moves without contacting the main surface of the recordation medium upon one of opening and closing movements of the shutter; and causing the support member to pivot in a backward route opposite the forward route such that the cleaner member moves contacting the main surface of the recordation medium upon the other of the opening and closing movements of the shutter.

11. The method according to claim 10, wherein a moving speed of the cleaner member is greater in the backward route than the forward route.

12. The method according to claim 10, wherein the recordation medium is rotated while the support is moving in the forward and backward routes.

13. The method according to claim 10, wherein the opening and closing movements of the shutter take place within an apparatus for replaying the recordation medium.

* * * * *